United States Patent [19]

Staub, Jr.

[11] 4,317,510
[45] Mar. 2, 1982

[54] TORQUE CONVERTER CLUTCH HAVING A VISCOUS DRIVE PORTION

[75] Inventor: Vincent M. Staub, Jr., Dayton, Ohio

[73] Assignee: General Motors Corporation, Detroit, Mich.

[21] Appl. No.: 171,754

[22] Filed: Jul. 24, 1980

[51] Int. Cl.³ ..................... F16D 47/06; F16D 33/00; F16D 35/00
[52] U.S. Cl. ................................. 192/48.3; 192/3.29; 192/58 B
[58] Field of Search ................ 192/58 B, 58 A, 58 C, 192/48.3, 3.28, 3.29, 3.3, 3.31

[56] References Cited

U.S. PATENT DOCUMENTS

| | | | |
|---|---|---|---|
| 2,166,961 | 7/1939 | Marsh | 192/48.3 X |
| 3,252,352 | 5/1966 | General et al. | 192/3.29 X |
| 3,275,108 | 9/1966 | General et al. | 192/48.3 X |
| 3,693,478 | 9/1972 | Malloy | 192/3.31 X |
| 3,910,391 | 10/1975 | Detty | 192/58 B |

*Primary Examiner*—Rodney H. Bonck
*Attorney, Agent, or Firm*—Donald F. Scherer

[57] ABSTRACT

A selectively engageable friction clutch is disposed in parallel drive relation with a torque converter. The friction clutch has a viscous drive portion which, during clutch engagement, permits relative rotation between the clutch input and output members so that the engine torsional vibrations are effectively dampened. The viscous drive portion has a plurality of hollow cylindrical hubs disposed in interdigital relation on respective input and output members. The cylindrical hubs on one of the input or output members has helical grooves formed on the cylindrical surfaces thereof so that the viscous fluid, preferably a silicone fluid, is pressurized between adjacent cylindrical surfaces to increase the efficiency of the viscous drive portion.

2 Claims, 2 Drawing Figures

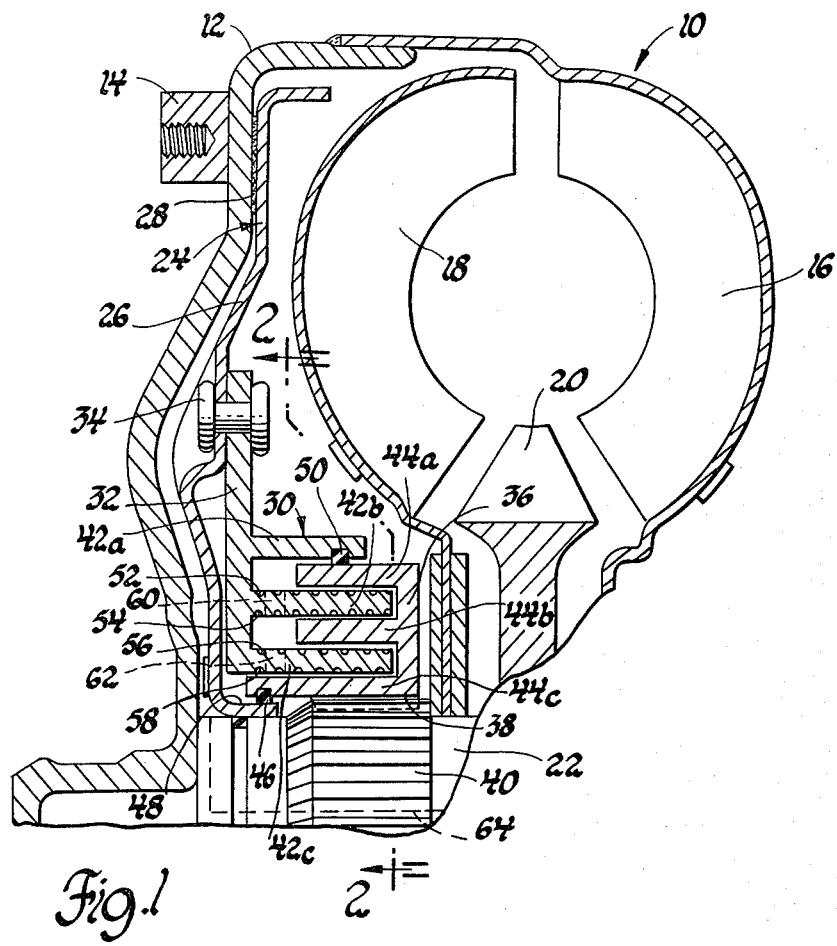
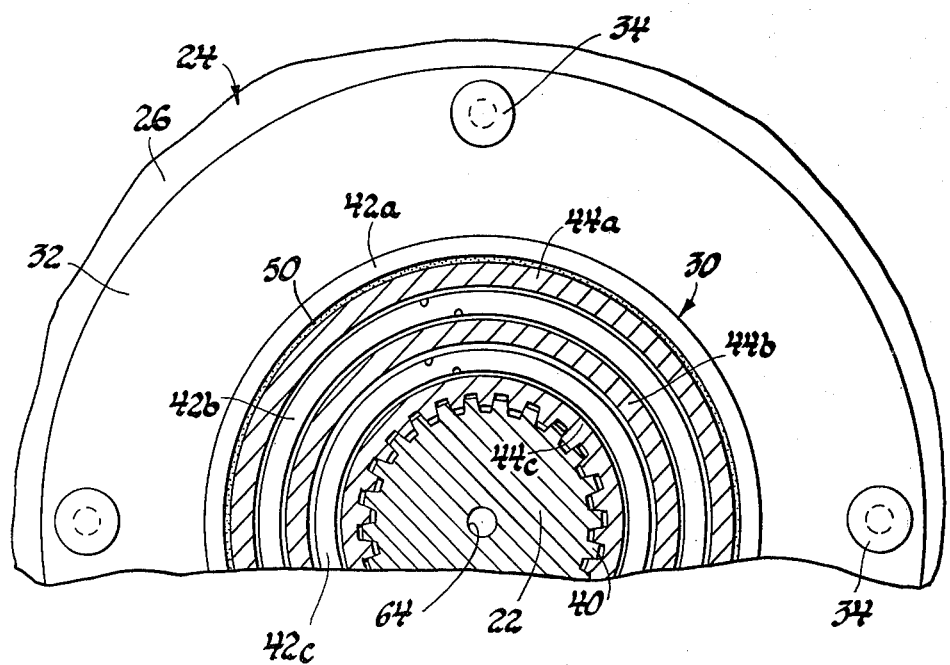

TORQUE CONVERTER CLUTCH HAVING A VISCOUS DRIVE PORTION

This invention relates to friction clutch and torque converter drives and more particularly to such drives wherein the friction clutch includes a viscous drive portion.

In an effort to improve the overall efficiency of the hydrodynamic type transmissions, the use of torque converter clutches is increasing. However, the torque converter clutch inherently prevents utilization of the high damping capacity of the torque converter. Therefore, a vibration damper must be utilized with the torque converter clutch in an effort to decrease the transmission of engine torsional vibrations. In order to simulate the smooth drive characteristic of the torque converter, a wide angle torsional vibration damper must be utilized. While the use of wide angle dampers is known, they are complex in structure and are constructed of a number of components.

The present invention proposes the utilization of a viscous drive unit in series with the torque converter clutch. The viscous drive unit as proposed, will utilize a high viscosity fluid such that very little slippage rates will occur. Due to the slight slippage which is present, the engine torsional vibrations will be effectively eliminated. The viscous drive unit will not provide as much efficiency of improvement as can be obtained with a mechanical damper. However, improved drivability is obtained. It is also possible to engage the torque converter clutch at lower vehicle speeds when a viscous drive portion is utilized, such that the total efficiency improvement throughout the entire drive range is substantially the same as or greater than a mechanical damping mechanism.

The present invention seeks to improve the efficiency of a viscous drive unit by incorporating a pumping action within the drive unit such that the viscous fluid is pressurized between the drive and driven components resulting in less slippage and therefore, improved efficiency.

It is therefore an object of this invention to provide an improved viscous drive mechanism for use with a torque converter clutch wherein a pumping action is provided within the viscous drive mechanism to increase the pressure of the viscous fluid disposed between the input and output members of the viscous drive.

It is another object of this invention to provide an improved viscous drive mechanism wherein a plurality of hollow cylindrical hub members are disposed in interdigital relation on respective input and output drive members and wherein a helical groove is formed in the cylindrical surfaces of one of the hub portions such that the viscous fluid disposed between the input and output members is subjected to a pumping action whereby the viscous fluid is pressurized between the input and output members.

These and other objects and advantages of the present invention will be more apparent from the following description and drawings in which:

FIG. 1 is a cross-sectional elevational view of a torque converter and clutch assembly incorporating a viscous drive mechanism; and FIG. 2 is a view taken along line 2—2 of FIG. 1.

Referring to FIG. 1, there is seen a torque converter 10 having an input shell 12 which has secured thereto, a drive lug 14 adapted to be connected to an internal combustion engine, not shown. The torque converter 10 further includes an impeller 16, a turbine 18 and a stator 20. The impeller 16 is welded or otherwise secured to the input shell 12, while the turbine 18 is welded or otherwise secured to a torque converter output shaft 22. The stator 20 is connected in a well-known manner through a conventional one-way drive device to a stationary portion of the transmission. The impeller 16, turbine 18 and stator 20 are conventional hydrodynamic drive members which provide a fluid drive in a well-known manner. As is known with fluid drives, such as torque converter 10, hydraulic fluid is circulated in the torus formed by the impeller 16, turbine 18 and stator 20.

A friction clutch assembly 24 is disposed between the input shell 12 and the turbine 18. The clutch 24 includes a pressure plate 26, a friction facing 28 and a viscous drive mechanism or clutch, generally designated 30. The friction facing 28 is bonded to the pressure plate 26 and is adapted, during clutch engagement, to frictionally engage the input shell 12, such that the pressure plate 26 and input shell 12 will rotate in unison. The viscous drive mechanism 30 includes an input disc or flange 32 which is secured by a plurality of rivets 34 to the pressure plate 26. The viscous drive 30 also includes an output flange 36 which has a splined inner portion 38 engaged with a spline 40 formed on the torque converter output shaft 22.

The input flange 32 has a plurality of cylindrical members 42a, 42b, 42c extending axially therefrom. The output flange 36 has extending therefrom a plurality of cylindrical hub members 44a, 44b, 44c which are, as seen in FIG. 1, interdigitably disposed with the cylindrical hub members 42a, 42b, 42c. The cylindrical hub member 44c includes the splines 38 and also has disposed therein, a seal member 46 which abuts an inner hub surface 48 of pressure plate 26. The cylindrical hub member 42a has disposed therein, a seal member 50 which abuts the outer surface of cylindrical hub member 44a. The hub 42b has a helical groove 52 formed in the outer surface thereof and helical groove 54 formed in the inner surface thereof. Cylindrical hub 42c has a helical groove 56 formed in the outer surface thereof and a helical groove 58 formed on the inner surface thereof. The cylindrical hubs 42b and 42c each have one or more radial through-passages 60 and 62 respectively formed therein.

The space envelope formed through the cooperation of pressure plate 26, input flange 32 and output flange 36 is filled with a high viscosity silicone fluid. The silicone fluid can have a viscosity of between 30,000 to 100,000 cts, but preferably has a viscosity of 60,000 cts at 100° C. The seals 46 and 50 cooperate to prevent the silicone fluid from escaping into the torque converter fluid which fills the environment surrounding the viscous drive mechanism.

The torque converter output shaft 22 has a central passage 64 through which hydraulic fluid is admitted when it is desirable to disengage the friction clutch 24. When it is desirable to engage the friction clutch 24, hydraulic fluid is admitted to the torque converter 10 in a conventional manner. Such reverse flow torque converter clutch mechanisms can be seen in the U.S. Patent to General et al. U.S. Pat. No. 3,252,352 issued May 24, 1966. A control mechanism for the reversal of flow and therefore the control of the friction clutch engagement and disengagement can be seen in U.S. Pat. No.

3,693,478 issued to Malloy, Sept. 26, 1972. When the clutch 24 is engaged, the pressure plate 26 and therefore input flange 32 will be rotated with the engine, while the output flange 36 will rotate in unison with the torque converter output shaft 22.

Due to the viscous drive mechanism 30, a speed differential will exist between the input shell 12 and the output shaft 22. The amount of speed differential is determined by the pressure in the silicone fluid, the effective surface area of the cylindrical hub members 42b and 42c and 44a, 44b, 44c, the clearance between adjacent hub members and the viscosity of the silicone fluid. The helical grooves 52, 54, 56 and 58 are constructed such that rotation of the input flange 32 will create a pumping action which forces the silicone fluid to move rightward, as viewed in FIG. 1, thereby increasing the pressure between the adjacent surfaces of cylindrical hubs 42b and 42c, and 44a, 44b and 44c.

As the speed differential between the input and output flanges 32 and 36 increases, the pressure in the silicone fluid will increase resulting in increased drive efficiency. Or, as stated another way, at the same speed differential, a viscous drive unit utilizing the present invention will have a higher drive efficiency than a viscous drive unit not utilizing the present invention.

The radial passages 60 and 62 permit the pressure balance in the silicone fluid trapped between the adjacent cylindrical hub members. It will also be appreciated by those skilled in the art, that upon drive reversal, that is during coasting, the pressure in the silicone fluid between adjacent cylindrical hub members will decrease resulting in a smoother backdrive or coast-down condition.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A viscous clutch comprising; an input member having friction means for frictionally engaging a rotary power source, a disc supporting said friction means and a plurality of hollow cylindrical input hub members extending axially from said disc; an output member having shaft means for delivering power from said viscous clutch, a radially extending flange portion secured to said shaft means, and a plurality of hollow cylindrical output hub members extending axially from said flange portion and being disposed circumjacent respective input hub members providing an interdigitaled relation therewith; and a viscous fluid in communication with said hub members, said plurality of input hub members having helical grooves formed on the axially extending radially inner and radially outer cylindrical surfaces thereof which cooperate with the adjacent axially extending cylindrical output hub surfaces so that upon relative rotation between said input and output members a pumping action is created between said hub members to pressurize the fluid therebetween and viscously transmit rotary drive from said input hub members to said output hub members.

2. A viscous clutch comprising; an input member having friction means for frictionally engaging a rotary power source, a disc supporting said friction means and a plurality of annular input hub members extending axially from said disc; an output member having shaft means for delivering power from said viscous clutch, a radially extending flange portion secured to said shaft means, and a plurality of annular output hub members extending axially from said flange portion and being disposed circumjacent respective input hub members; and a viscous fluid in communication with said hub members, one of said plurality of input hub members and plurality of output hub members having helical grooves formed on the radially inner and radially outer surfaces thereof which cooperate with the adjacent hub surfaces so that upon relative rotation between said members a pumping action is created between said hub members to pressurize the fluid therebetween and transmit rotary drive from said input hub members to said output hub members.

* * * * *